Patented Nov. 27, 1951

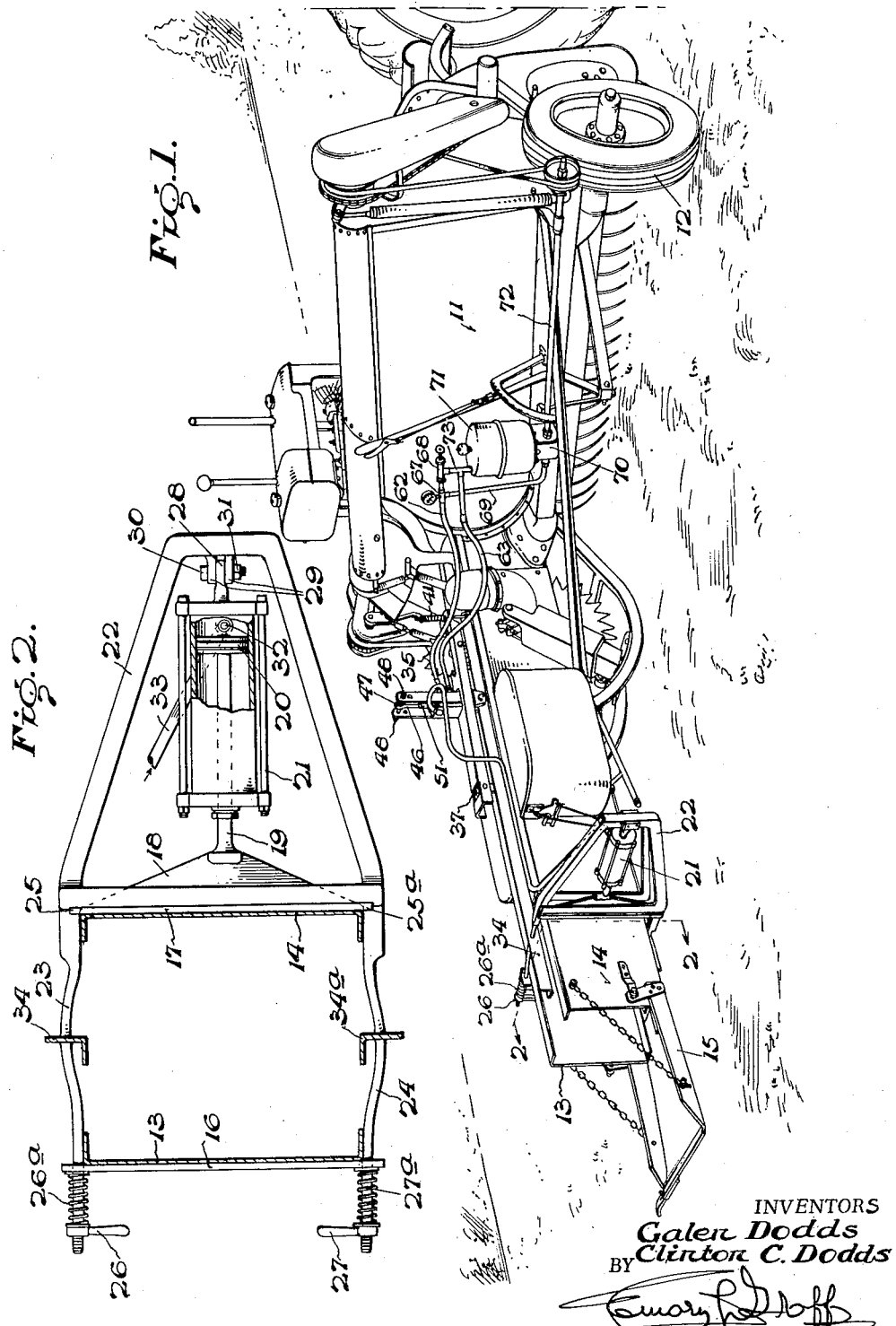

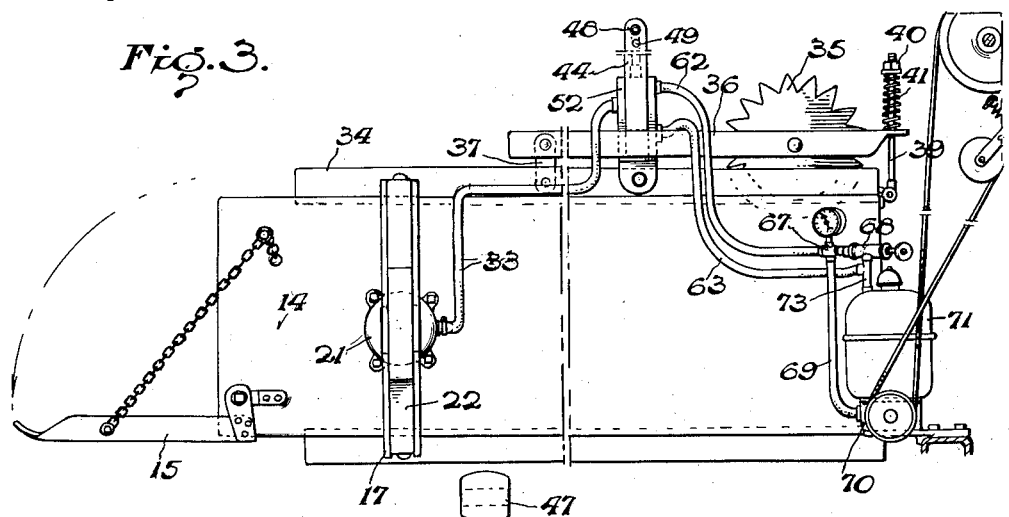

2,576,784

UNITED STATES PATENT OFFICE 2,576,784

AUTOMATIC HAY BALER CONTROL

Galen Dodds and Clinton C. Dodds, Onaga, Kans.

Application September 9, 1949, Serial No. 114,862

1 Claim. (Cl. 100—23)

This invention relates to hay balers and is more particularly concerned with improvements therein for the purpose of producing bales of hay of uniform density.

In ordinary hay balers of the type which are moved along the ground, manual means are sometimes provided for adjusting the density of the bales. As the baler operates over the different terrains, it may encounter hay of different physical characteristics. For example, in operating over hilly terrains, it is customary to find that the hay at the top of the hills is drier than hay at the bottom of the hills or in the valleys. Also, the amount of hay per unit area at the tops of the hills is less than the amount of hay per unit area at the bottom of the hills. Other conditions may create other differences in the hay at different locations. Many of these conditions cause a variation in the density of the bale made by a baler of the type mentioned. For example, moist hay will bale to a greater density than dry hay.

It is important to provide not only uniform density but also for a proper density of the bales in order to prevent spoilage of the hay. For example, if a bale of hay is too dense, air will not permeate through it. This will cause the development of heat and mold in the bale during storage which damages the hay. On the other hand, if the bale is not dense enough it will fall apart.

In prior devices it was necessary to manually adjust the hay baler when different conditions were met in order to obtain bales of proper density. This required frequent stopping and starting of the equipment with consequent loss of time and labor. Moreover, an accurate control of the density is not possible with such manual adjustments.

One of the objects of this invention is the provision of means associated with a baler of the type mentioned which results in an accurate, automatic and continuous control of the density of bales of hay as they are being formed.

Another object of this invention is the provision of such means which are positive in operation and simple to control.

A still further object of the invention is the provision of such means which is relatively inexpensive and which can be readily adapted to ordinary balers of the prior art.

A still further object of the invention is the provision of such means which can be adjusted to provide control for different densities under any particular conditions which may be met.

These and other objects of the invention will be more fully understood from the following description considered together with the accompanying drawing in which drawing:

Fig. 1 is an isometric view of the rear end of a baler showing the attachments of this invention thereon.

Fig. 2 is a cross section of the baler chute along the line 2—2 of Fig. 1.

Fig. 3 is a schematic elevational view of the fluid pressure system.

Fig. 4 is a vertical section through the valve unit.

Fig. 5 is an isometric view of the floating lever.

Referring with more particularity to the drawing in which like numerals designate like parts, the embodiment illustrated comprises the combination of certain elements with an ordinary hay baler having a frame structure 11 mounted on wheels 12 and which contain the usual mechanisms for gathering hay from the ground and delivering it into a chute formed of two spaced horizontal channels 13 and 14 extending rearwardly. The front ends of the channels are secured to the frame of the baler and the rear ends are yieldably connected to a bottom slide 15 extending rearwardly and over which the tried bales are discharged.

At the rear section of the chute there is disposed a pair of press plates 16 and 17 on opposite sides. The plate 16 abuts the channel 13 while the plate 17 abuts the channel 14. An arrangement of this type is customarily employed in balers and is used to control the density of the bale. Ordinarily, the density is controlled by manually adjusting the position of the rear sections of the chute relative to each other. In the present invention, this adjustment is automatically accomplished by means hereinafter described.

A triangular-shaped rib 18 is secured to the back of the plate or platen 17. Said rib is connected to one end of a horizontal piston rod 19. The other end of the rod carries a piston 20 which operates in an enclosed cylinder 21 disposed in a frame 22 on the side of the chute. The frame is provided with a pair of arms 23 and 24 which straddle the chute at the top and bottom, respectively, and pass through notches 25 and 25a at the top and bottom of the plate 17. The outer ends of said arms are threaded and extend beyond the chute to carry the plate 16, compression springs 26a and 27a and nuts 26 and 27.

The cylinder 21 is provided with a projection 28 which is disposed between a pair of spaced lugs 29 and to which it is connected by means of a bolt 30 held in place by a nut 31. A port 32 is situated through the wall of the cylinder 21 between the outer end of the cylinder and the fartherest outer position of the piston 20. The said port 32 is connected to one end of a hose or other tubular member 33.

A guide or hold down bar 34 is horizontally disposed on top of the chute between the channel members 13 and 14 and is anchored at one end to the arm 23 and at the other end to the baler frame. A similar supporting guide bar 34a is disposed at the bottom of the chute.

A toothed wheel 35 is rotatably mounted on the forward end of a floating lever 36 which is disposed above and parallel to the bar 34 at the forward end of the chute. The lever 36 is preferably in the form of an inverted channel and its rear end is connected to the bar 34 by means of a link 37. The front end of the floating lever is provided with an aperture 38 through which a vertical rod 39 extends. The lower end of the rod is hinged to the bar 34 and the other end is threaded to receive a nut 40. Between the nut 40 and lever 36 a coil spring 41 is interposed to load the forward end of the lever and hence to urge the toothed wheel 35 downwardly into the hay entering the chute. By adjusting the position of the nut 40 on the rod 39 a change in the tension of the coil spring is effected.

To the rear of the toothed wheel 35 an aperture 42 is provided through the top of the lever 36 on the sides of which a pair of upright arms 43 and 44 are secured.

A valve unit 45, hereinafter more fully described, is vertically disposed through the aperture 42 the lower end of which is pin-connected to the bar 34. The valve unit includes a vertical rod 46 at the top which is provided with an eye 47 and is connected to the arms 43 and 44 by means of a bolt 48 passing through the eye 47 and one of a pair of apertures 49 and 50 in the said upright arms. A number of said apertures are provided at different elevations for adjusting purposes. Also, the lower end of the rod 46 is threaded and engages internal threads through the top of the piston member 51 of the valve unit.

The valve unit also comprises a cylindrical or other suitable shaped body 52 having a vertical bore 53 into which the piston 51 slides. The lower end of the bore 53 is provided with a screw plug 54 for cleaning purposes and a gland nut 55 is provided at the top of the bore about the piston 51.

One side of the valve carries a pair of vertically spaced horizontal ducts 56 and 57 connected together by a vertical duct 58 leading to outlet 59, said outlet being connected to the other end of the hose 33. On the opposite side of the valve a second pair of ducts 60 and 61 are provided diametrically opposite the ducts 56 and 57, respectively. The duct 60 is connected to a hose 62 and the duct 61 is connected to a hose 63; both leading to a fluid pressure unit hereinafter more fully described.

The piston 51 carries a pair of annular recesses 64 and 65 about its periphery said recesses being spaced in an amount greater than the distance between the ducts 60 and 61 or 56 and 57, the exact spacing being dependent upon the degree of sensitivity desired. It is obvious, therefore, that when the piston 51 moves to a position such that the recess 64 is in line with the ducts 56 and 60, fluid will flow through said ducts and recesses, also when the recess 65 is aligned with the ducts 57 and 61 fluid will flow therethrough. A pressure relief duct 66 extends from the lower end of the bore 53 to the duct 61.

The tubular member 62 is connected to one arm of a T joint 67; the other arm being connected to the outlet of a valve 68. The center tap of the T joint is connected to a pipe 69 leading to the outlet of a fluid pump 70. Said pump is surmounted by a tank 71 which is connected to the inlet of the said pump 70. The pump is driven by a shaft 72 which is connected to a suitable power take-off of the baler. The other side of the valve 68 is connected to the top of the tank by a short pipe 73 and the hose 63 is tapped into the side of the said pipe 73.

In operation, as the baler moves over the ground gathering the hay and delivering it into the mouth of the chute at the forward end, the hay becomes packed in the chute. As the hay passes through the chute beneath the toothed wheel 35 it elevates said wheel against the action of the spring 41 in an amount corresponding to the density of the hay at that point. Elevation of the wheel causes the floating lever 36 to pivot and carry with it the piston 51 to which it is connected as described above. Since the body of the valve unit is fixed to the bar 34 a relative movement between the valve body and the piston 51 is effected. At the same time the fluid pump 70 is being driven to develop pressure and tend to force fluid through the pipe 62. When the position of the annular recesses 64 and 65 are not in alignment with the ducts 60 and 61, respectively, no fluid flows through the valve unit. However, when the density of the hay beneath the toothed wheel 35 decreases the wheel sinks farther into the hay and eventually causes an alignment of the recess 64 with the ducts 56 and 60; thereby causing fluid to pass through the valve unit from the pipe 62 into the hose 33 and hence into the head of the cylinder 21, thereby forcing the piston 20 to the left as viewed in Fig. 2 which in turn causes the press plate 17 to move inward toward the fixed plate 16. This results in a restriction of the area through which the baled hay passes and creates a back pressure against the hay being delivered into the chute. This back pressure consequently causes the density of the hay in the chute to increase. As the density increases, it forces the toothed wheel upward carrying with it the lever 36 and the piston 51 which cuts off the flow of fluid from the pipe 62. Should the density increase too greatly the toothed wheel 35 would be further elevated and cause the recess 65 to become aligned with the ducts 57 and 61 which would cause liquid to flow out of the cylinder 21 into the hose 33 through the duct 57, recess 65, duct 61, pipe 63 and eventually into the inlet pipe 73 of the tank 71. This would permit pressure on the plate 17 to force it back towards the channel 14 and thereby lessens the back pressure on the hay with a resulting lessening of density.

It is to be understood that the fluid in this system may be either liquid or gas, such as oil, water, air, etc.

We claim:

In a hay baler having a bale chute including a movable platen on one side of the chute, a cylinder having a piston connected to said platen, a bar on top of and substantially parallel to the chute, a toothed wheel carried by the bar in a vertical plane at one end thereof, said wheel being positioned to engage the top side of hay passing through the chute, a vertical link pivotally connecting the other end of the bar to the chute, resilient means biasing said bar against pivotal movement under the force of hay in the chute acting on said wheel, a fluid valve assembly having a body secured to the chute, said assembly also having a fluid inlet and a fluid outlet, a source of fluid under pressure connected to said inlet, said outlet being connected to said cylinder, a reciprocable operator for controlling the flow of fluid between said inlet and said outlet, said operator having an extension pivoted to said bar.

GALEN DODDS.
CLINTON C. DODDS.

REFERENCES CITED

The following references are of record in the file of this patent:

UNITED STATES PATENTS

| Number | Name | Date |
| --- | --- | --- |
| 2,396,720 | Nolt | Mar. 19, 1946 |
| 2,478,012 | Raney | Aug. 2, 1949 |